United States Patent [19]

Mueller

[11] Patent Number: 4,467,649

[45] Date of Patent: Aug. 28, 1984

[54] APPARATUS FOR BALANCING ROTATABLE BODIES

[75] Inventor: Richard Mueller, Lynchburg, Va.

[73] Assignee: American Hofmann Corporation, Lynchburg, Va.

[21] Appl. No.: 381,841

[22] Filed: May 25, 1982

[51] Int. Cl.³ .................................. G01M 1/16
[52] U.S. Cl. ........................ 73/462; 73/464
[58] Field of Search ..................... 73/462, 464

[56] References Cited

U.S. PATENT DOCUMENTS

| | | | |
|---|---|---|---|
| 2,243,457 | 5/1941 | Esval et al. | 73/462 |
| 3,835,712 | 9/1974 | Muller | 73/462 |
| 3,854,339 | 12/1974 | Muller | 73/462 |
| 3,910,121 | 10/1975 | Curchod et al. | 73/462 |
| 4,062,242 | 12/1977 | Brihier | 73/462 |
| 4,201,091 | 5/1980 | Guyot et al. | 73/462 |

FOREIGN PATENT DOCUMENTS 36783 3/1979 Japan ........................... 73/462

Primary Examiner—James J. Gill
Assistant Examiner—John E. Chapman, Jr.
Attorney, Agent, or Firm—Fleit, Jacobson, Cohn & Price

[57] ABSTRACT

An apparatus for balancing a body to correct for unbalance determined during a measurement run on a balancing machine. The body to be balanced is rotated at a measuring speed by compressed air and the unbalance is determined. A braking device then is applied to the body to brake the body and rotate the body at a low speed. When a predetermined portion of the body is located in a desired angular position, a stopping device, such as a pawl, is actuated to stop rotation of the body. Appropriate mass is then added to or removed from the body to correct the unbalance. If necessary, the pawl is released, and body is incrementally rotated so that unbalance can be corrected on several portions of the body. The apparatus, instead of balancing the body, is usable to mark the body as to the location of unbalance.

6 Claims, 4 Drawing Figures

APPARATUS FOR BALANCING ROTATABLE BODIES

BACKGROUND OF THE INVENTION

The present invention relates to an apparatus for balancing rotatable bodies or rotors. More particularly, the invention relates to a balancing apparatus that has a braking device for reducing the speed of rotation of a body being rotated by compressed air.

DESCRIPTION OF THE PRIOR ART

U.S. Pat. No. 3,854,339 describes a method and an apparatus for balancing rotors, the type and/or shape of which permit mass correction to be carried out at predetermined correction positions. In the described method, the rotor is first scanned to generate a phase reference signal required for unbalance measurement and relative to the correction positions provided for mass correction. The rotor is then stopped, and mass correction carried out at the positions determined for this purpose.

With the described apparatus, the rotor is first run up to measuring speed by means of a flexible belt. The flexible belt is in contact with a circumferentially extending portion of the rotor so that vibrations of the belt tend to have a minimum adverse effect on measurements. The vibrations due to unbalance are sensed, and the correction positions are scanned with a pulse serving as phase reference signal. The speed of the driving motor is then reduced to run the rotor at a lower speed. While running at this reduced speed, a capacitor is discharged via a coil, and an indexing pawl is engaged with the rotor. As a result, the rotor is stopped automatically at the indicated component for subsequent mass correction.

If turbo-chargers or compressor wheels are balanced, the shape of these rotors does not permit drive by a flexible belt. Also, a friction wheel cannot be used because it has too much influence on measured results. In this case, preference is given to drive by compressed air. The disadvantage is that a speed less than measuring speed that permits engagement of the pawl with the rotor or actuation of a marking device, cannot be reliably reached.

SUMMARY OF THE INVENTION

Therefore, it is an object of the present invention to provide an apparatus for balancing a rotor or body which permits the body to be scanned at predetermined positions in consideration of its shape and type, and in which drive of the body to measuring speed is by means of compressed air. After the measuring run, the rotor is stopped in a position required for mass correction. Alternatively, the rotor is slowed to a speed such that a mark or marks representative of unbalance can be applied to the rotor.

With the apparatus provided by the present invention, the rotor, after measurement has been carried out, is braked to a speed lower than the measuring speed that is appropriate for the locking or marking device. As the braking unit is arranged on a carriage, it approaches the rotor in a quick and easy manner, preferably from below.

Furthermore, the rotor can be indexed automatically to another position provided for mass correction or to the second correction component, even after stopping of the rotor. In this case, indexing is carried out by means of the driving motor of the braking unit in consideration of the reduction ratio between the friction wheel driven by the rotor and the radius at which the friction wheel contacts the rotor.

The invention, and its objects and advantages, will become more apparent in the detailed description of a preferred embodiment hereinafter presented.

BRIEF DESCRIPTION OF THE DRAWINGS

One embodiment of the apparatus provided by the present invention is illustrated in the accompanying drawings, in which.

DESCRIPTION OF THE PREFERRED EMBODIMENT

The present description will be directed in particular to elements forming part of, or cooperating more directly with, the present invention. Elements not specifically shown or described herein are understood to be selectable from those known in the art.

Figure 1:
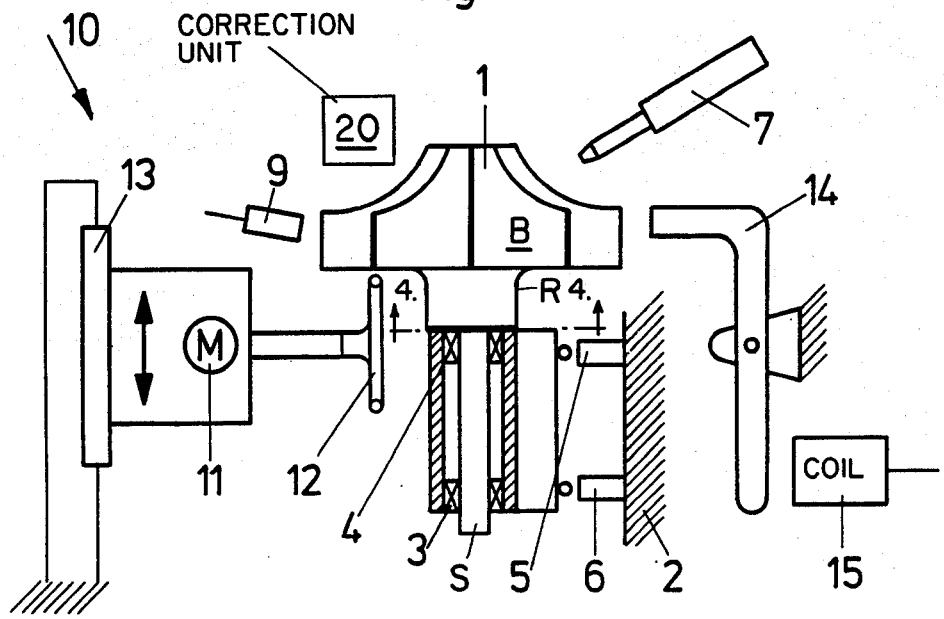
FIG. 1 is a schematic diagram of one embodiment of an inventive balancing apparatus provided with a locking pawl.
Figure 2:
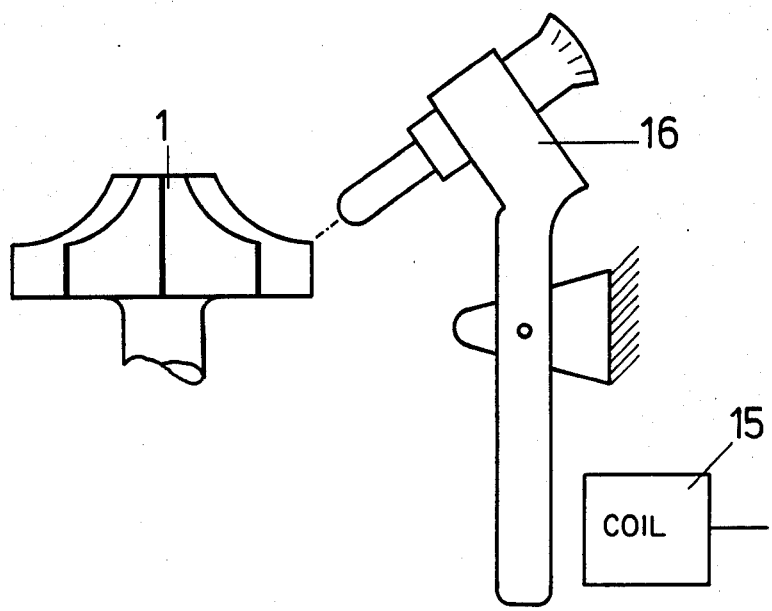
FIG. 2 is a simplified representation of the balancing apparatus provided with a marking device.

The body to be balanced, i.e., compressor wheel 1 in FIG. 1, is loaded with its shaft S vertically received in two bearings 3 and 4 of a balancing machine, such as a modified version of the machine described in U.S. Pat No. 4,201,091 or U.S. Pat. No. 3,910,121. The bearings are preferably supported on force-measuring transducers 5 and 6 which are mounted on the machine housing 2. Drive of the rotor 1 up to measuring speed, for instance 2,000 rpm, is by means of air nozzle 7, which blows against the blades B of the compressor wheel 1. The blades B extend outwardly from a rotor R at the top of shaft S.

Figure 3:
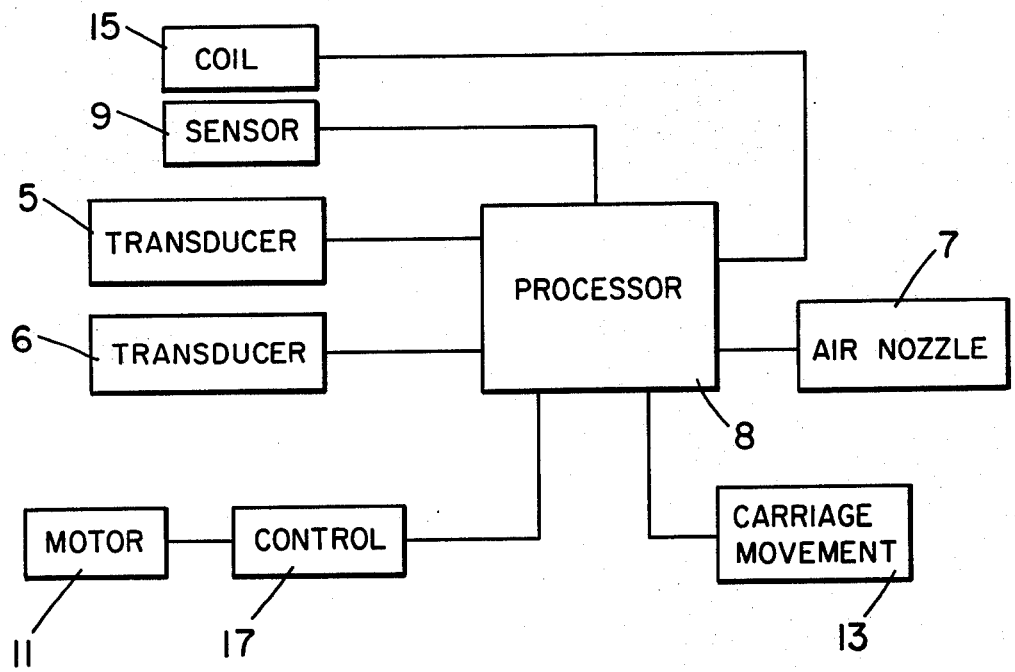
FIG. 3 is a schematic circuit diagram of the measuring and indexing device.
Figure 4:
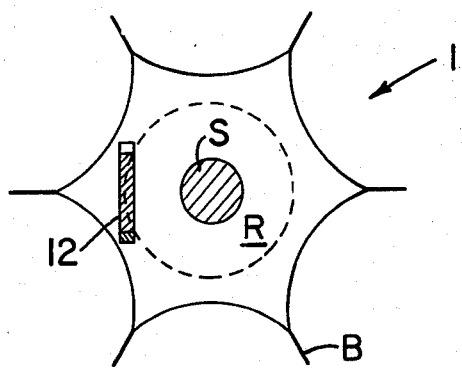
FIG. 4 is a view along line 4—4 of FIG. 1.

Signals representative of unbalance measured by the transducers 5 and 6 are passed to an electronic unit 8 for further processing (FIG. 3). The electronic unit 8, such as a unit of the type described in U.S. Pat. No. 4,062,242 or U.S. Pat. No. 3,835,712, is also fed with the signals received by the sensor 9, which is preferably an inductive pick-up and scans predetermined positions of the body 1. The amount and location of unbalance are determined, for example, in a manner described in more detail in U.S. Pat. No. 3,854,339.

After the measuring run, the braking device, which is generally designated 10 in FIG. 1, which, for example, is a motor 11 provided with a friction wheel 12, approaches the flange of the rotor portion R of the body 1 from below. The braking device can be arranged on a carriage 13 that is movable by a movement device, such as a piston-cylinder unit, in a vertical direction, as indicated by the arrows. The friction wheel 12 frictionally engages the rotor R and brakes the body down to a reduced speed, such as 60 rpm, so that pawl 14 operated by coil 15 is engaged with the blades B of the body, thus stopping the body in a position suitable for mass correction by a correction unit 20, such as that described in U.S. Pat. No. 4,062,242. Air pressure cannot be used to rotate the body at a sufficiently low speed because of friction between shaft S and the bearings 3 and 4.

Pawl 14 can be replaced by the marking device 16, which is also preferably operated via the coil 15. When a desired portion of the slowly rotating body is correctly oriented with respect to marking device 16, the coil 15 is actuated to move the device 16 toward the body to apply a mark to one or more of the blades B. Alternatively, the device 16 is actuated to spray a mark on a desired blade or blades.

To index the body 1, for example to the second correction component, pawl 14 is first disengaged. The friction wheel 12 is then driven to turn the body 1, in consideration of the reduction ratio between the radius of the friction wheel and the radius at which the wheel contacts the flange of the rotor portion of the body. For this purpose, the motor 11, via a suitable control means 17, such as an electric switch, is controlled by the electronic unit 8. The unit 8, in addition to turning the motor 11 "on" and "off", also controls actuation of the nozzle 7.

Previously, a specific embodiment of the present invention has been described. It should be appreciated, however, that such embodiment has been described for the purposes of illustration only, without any intention of limiting the scope of the present invention. Rather, it is the intention that the present invention be limited only by the appended claims.

What is claimed is:

1. An apparatus for balancing a body scanned at predetermined positions in consideration of its shape and type comprising:

means for generating a phase reference signal representative of unbalance measurement during scanning of a body rotating at a measuring speed;

means using compressed air for driving the body at the measuring speed;

means for stopping the body after the measuring run at a position provided for mass correction, said position determined by said phase reference signal; and a braking device for braking the body after the measuring run to a speed less than the measuring speed so that an operative component of the means for stopping the body can be applied to the body to thereby stop the body, said braking device comprises a driving motor, and a friction wheel driven by the motor, the friction wheel being engageable with a surface of the body.

2. Apparatus according to claim 1, in which the braking device further comprises a carriage positioned below the body that is movable towards and away from the body, said carriage supporting the driving motor and friction wheel.

3. Apparatus according to claim 1, further comprising a control unit, said braking device being connected with the control unit for indexing the body to the position for mass correction.

4. Apparatus according to claim 1, further comprising a marking device for marking the body at a position clearly defined relative to the location of unbalance.

5. Apparatus according to claim 1, further comprising a mass correction unit for correcting sensed unbalance in the rotor.

6. An apparatus for marking a body scanned at predetermined positions in consideration of its shape and type comprising:

means for supporting the body for rotation about an axis;

means using compressed air for rotating the body at a measuring speed;

means for determining unbalance in the components of the body while rotating at the measuring speed;

means for braking the speed of the rotating body and for rotating the body at a slow speed, said means for braking including a friction wheel engageable with a portion of the body to brake the speed of rotation of the body and to rotate the body at the slow speed, means for moving the friction wheel into and out of frictional engagement with the body, and means for rotating the friction wheel;

means for sensing the positions of components of the body where unbalance has been determined and for generating signals representative of the sensed positions; and means for applying a mark to the body rotating at the slow speed, said means for applying being responsive to said signals.

* * * * *